United States Patent [19]
Surette

[11] Patent Number: 5,632,142
[45] Date of Patent: May 27, 1997

[54] STATIONARY GAS TURBINE POWER SYSTEM AND RELATED METHOD

[76] Inventor: Robert G. Surette, 2253 Micheltorena St., Los Angeles, Calif. 90039

[21] Appl. No.: 388,713

[22] Filed: Feb. 15, 1995

[51] Int. Cl.$^6$ ........................................ F02C 7/00
[52] U.S. Cl. .................... 60/39.02; 60/39.41; 60/39.5
[58] Field of Search ................... 60/39.02, 39.07, 60/39.182, 39.41, 39.5, 262, 269; 415/914; 417/158, 159

[56] References Cited

U.S. PATENT DOCUMENTS

| | | | |
|---|---|---|---|
| 2,700,830 | 2/1955 | Wolfe | 60/39.07 |
| 3,144,202 | 8/1964 | Helmbold . | |
| 3,185,252 | 5/1965 | Lemmerman . | |
| 3,684,054 | 8/1972 | Lemmerman | 181/33 HC |
| 3,710,617 | 1/1973 | Andersen | 73/116 |
| 3,839,846 | 10/1974 | Teller | 55/15 |
| 3,899,923 | 8/1975 | Teller | 73/116 |
| 4,098,073 | 7/1978 | Adkins et al. | 60/39.16 R |
| 4,497,445 | 2/1985 | Adkins et al. | 239/590 |
| 4,748,805 | 6/1988 | Rigault et al. | 60/39.5 |
| 5,188,510 | 2/1993 | Norris et al. | 415/208.1 |

FOREIGN PATENT DOCUMENTS

| | | | |
|---|---|---|---|
| 2605579 | 12/1976 | Germany | 60/269 |

OTHER PUBLICATIONS

Essig, Robert H. et al., "Jet Diffuser For Simulating Ram-–Pressure and Altitude Conditions on a Turbojet–Engine Static Test Stand," National Advisory Committe for Aeronautics, (undated).

Povolny, John H., "Use of Choked Nozzle Technique and Exhaust Jet Diffuser for Extending Operable Range of Jet–Engine Research Facilities," National Advisory Committee for Aeronautics, (undated).

*Primary Examiner*—Louis J. Casaregola
*Attorney, Agent, or Firm*—Pretty, Schroeder, Brueggemann & Clark

[57] ABSTRACT

This disclosure provides a stationary gas turbine power system that develops a reduced back pressure for the gas turbine engine and thus greater efficiency. An enclosed ejector is positioned downstream of the engine's exhaust plane, and means such as a downstream diffuser cause the exhaust stream to entrain air from the ejector enclosure, by natural pumping action, so as to develop a sub-atmospheric pressure within that enclosure and thus at the engine's exhaust plane. This provides substantially improved engine efficiency. The diffuser recovers the static pressure to a level sufficient to drive any downstream devices.

21 Claims, 4 Drawing Sheets

STATIONARY GAS TURBINE POWER SYSTEM AND RELATED METHOD

BACKGROUND OF THE INVENTION

This invention relates generally to gas turbine engines and, more particularly, to gas turbine power systems configured for use in stationary, ground-based applications.

Gas turbine power systems of this particular kind are commonly used in numerous applications, including the compression of gas and the generation of electrical power. When used as part of a co-generation electrical power plant, such systems typically include a gas turbine engine that rotates a drive shaft coupled to an electrical generator and optionally further include a heat recovery device such as a steam generator that recovers heat from the engine's exhaust stream.

One typical gas turbine power system of this kind is illustrated schematically in FIG. 1. The illustrated system is a "cold-end drive" installation, with its electrical generator mechanically linked to the engine adjacent the engine's low-pressure compressor, where cold air arrives at the engine's intake. More particularly, a gas turbine engine 11 drives a rotary power drive shaft 13 that is connected to an electrical generator 15, to generate electrical power. The engine is driven by a hydrocarbon fuel and air, which is delivered via an inlet duct 17 and fed to the engine's intake 19 around the drive shaft. The engine produces a hot exhaust stream that is directed through an exhaust plane 21 to a heat recovery steam generator 23, where heat is recovered from the exhaust and used to produce additional electrical power. Finally, the exhaust stream exits the system via an exhaust stack 25.

Passage of the exhaust stream through the heat recovery steam generator 23 and the exhaust stack 25 can lead to a pressure loss on the order of 11 to 14 inches of water, or 0.4 to 0.5 pounds per square inch. This, in turn, requires a corresponding positive pressure at the site of the engine's exhaust plane 21. While the gas turbine engine 11 can readily provide the required positive pressure at its exhaust plane, this level of back pressure can impose upon the engine an efficiency or power loss that is typically 2% greater than a gas turbine engine exhausting freely into the atmosphere.

Many parameters affect the output and efficiency of gas turbine power systems, and turbine designers have steadily improved the basic efficiency of such systems, typically using ever-higher combustion temperatures and more efficient internal aerodynamic designs. Some design efforts also have been directed towards reducing the power loss through any downstream device such as a heat recovery steam generator. Such efforts have reduced the engine's back pressure, and thus improved efficiency. It is considered, however, that the back pressure imposed on the engine can be reduced even further.

It should, therefore, be appreciated that the need exists for a stationary gas turbine power System that further improves efficiency, specifically by further reducing the back pressure imposed on the system's gas turbine engine. The present invention satisfies these needs and provides further related advantages.

SUMMARY OF THE INVENTION

The present invention is embodied in an improved stationary gas turbine power system, and related method, that is configured to provide a significantly reduced back pressure for the gas turbine engine, which dramatically increases the engine's operating efficiency. In particular, the system includes an ejector located downstream of the engine's exhaust plane, along with means such as a diffuser for developing a sub-atmospheric pressure at the ejector, and thus at the exhaust plane. This reduced back pressure dramatically improves the engine's efficiency, yet the diffuser recovers sufficient pressure from the exhaust stream to drive any optional downstream device such as a conventional heat recovery steam generator.

The ejector can be configured as an annular gap in a wall that defines the exhaust stream's flow path. The gap leads to a closed chamber that is defined by a surrounding enclosure, or plenum. The flow of the exhaust stream past the ejector entrains air from the chamber, by natural jet pumping action, so as to develop within the chamber a sub-atmospheric pressure. Positioning the ejector adjacent to the engine's exhaust plane creates a corresponding sub-atmospheric pressure at that plane, to reduce the back pressure applied to the engine and thereby improve the engine's efficiency.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve only as a particular example of the invention.

DESCRIPTION OF THE PREFERRED EMBODIMENTS

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example of the invention.

Figure 1:
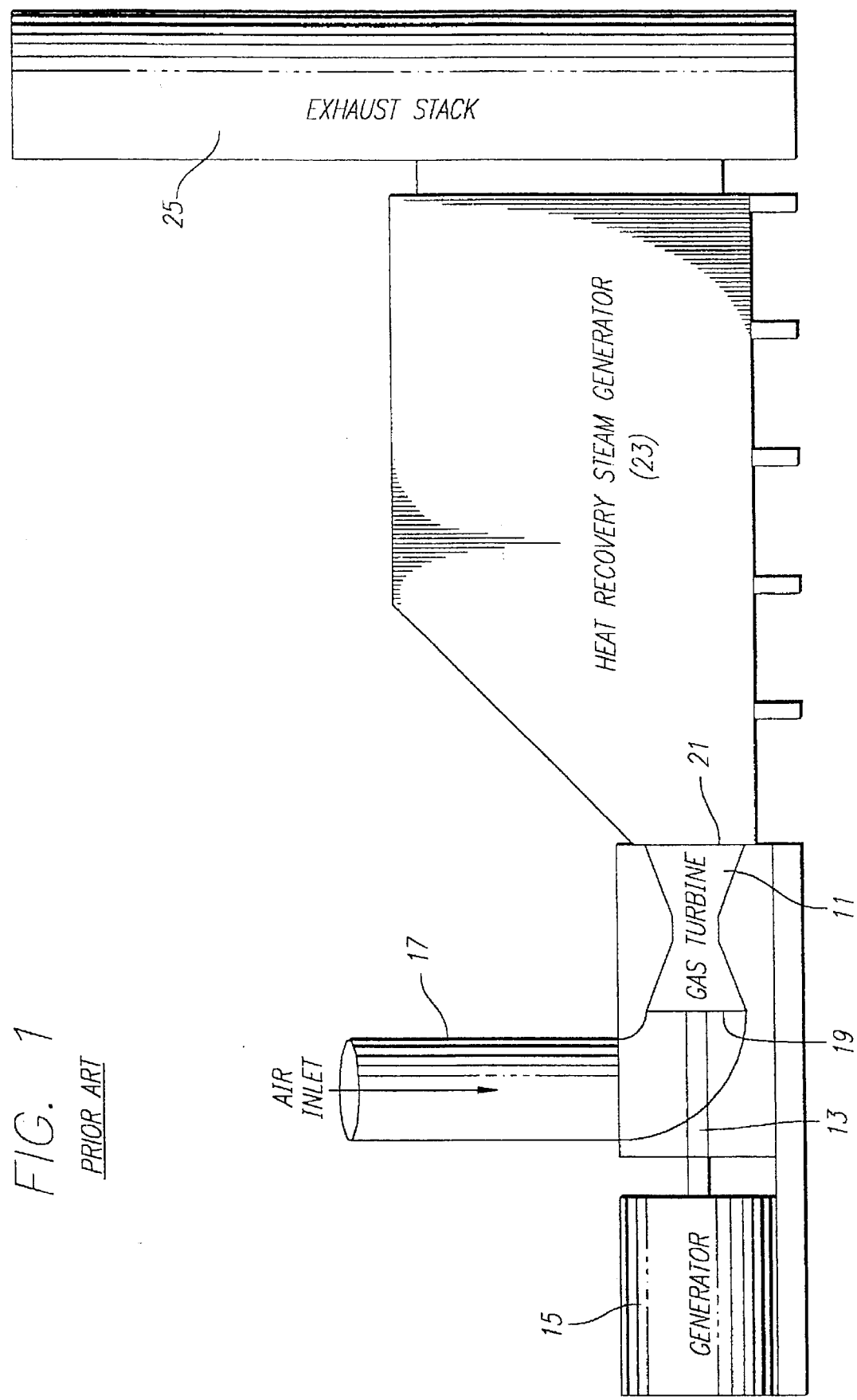
FIG. 1 is a schematic diagram of a conventional stationary gas turbine power system having a cold-end drive and a steam generator that recovers heat from the engine's hot exhaust stream.
Figure 2:
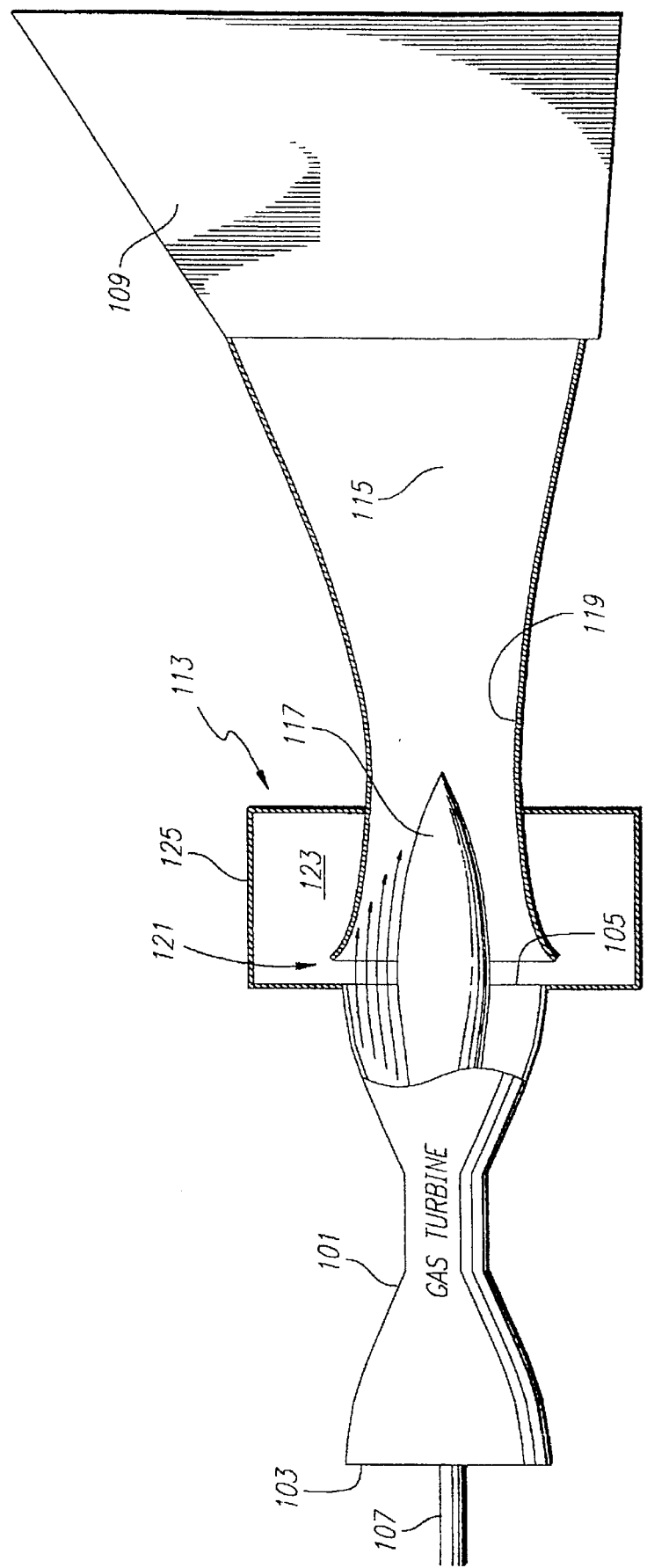
FIG. 2 is a schematic diagram of a stationary gas turbine power system according to the present invention, incorporating an ejector and diffuser, to reduce the engine's back pressure.

FIG. 2 illustrates a stationary, ground-based gas turbine power system that includes a gas turbine engine 101 having an air intake 103, an exhaust plane 105, and a power drive shaft 107 that connects to an electrical generator (not shown). A transition duct 109 channels the engine's exhaust stream to a conventional heat recovery steam generator (not shown) to recover heat from the exhaust stream. In accordance with the invention, an ejector 113 and a diffuser 115 are located in the path of the exhaust stream, between the engine's exhaust plane 105 and the transition duct 109, to reduce the back pressure present at the exhaust plane and thereby improve the engine's efficiency. Moreover, this back pressure can be reduced to a sub-atmospheric level even while allowing the exhaust stream later to recover sufficient pressure to overcome the pressure losses inherent in the downstream heat recovery steam generator.

More particularly, the exhaust stream of the gas turbine engine 101 is an annular flow that encircles the engine's bearing and shaft assembly. This annular flow stream continues downstream of the engine's exhaust plane 105, with a rearwardly projecting, generally conical nozzle plug 117 and a concentric, generally bell-shaped wall 119 defining the annular flow path. This annular flow path is depicted to have a cross-sectional area that is slightly convergent at the upstream end of the ejector and that thereafter is substantially uniform. The nozzle plug and the wall that define this flow path are smoothly contoured, so as to minimize turbulence.

The upstream end of the bell-shaped wall 119 forms part of the ejector 113, which further includes a ring-shaped gap 121 that leads to a closed chamber 123 defined by an enclosure or plenum 125. Jet pumping action of the flow of the exhaust stream through the annular channel defined by the nozzle plug 117 and the bell-shaped wall 119 entrains air from within the ejector's closed chamber 123 via the gap 121. The optimum placement of the bell-shaped wall relative to the exhaust plane 105 is subject to the configuration of the engine and to downstream conditions. A sub-atmospheric pressure within that chamber, and thus at the engine's exhaust plane 105, thereby is automatically created. This sub-atmospheric back pressure provides the gas turbine engine 101 with a dramatically improved efficiency.

Downstream of the nozzle plug 117, the bell-shaped wall 119 begins to diverge, so as to provide a gradually increased cross-sectional area without flow separation. This portion of the wall defines the diffuser 115, which functions to slow the exhaust stream and recover the pressure to a level sufficient to overcome the pressure losses inherent in the downstream heat recovery steam generator.

Figure 3:
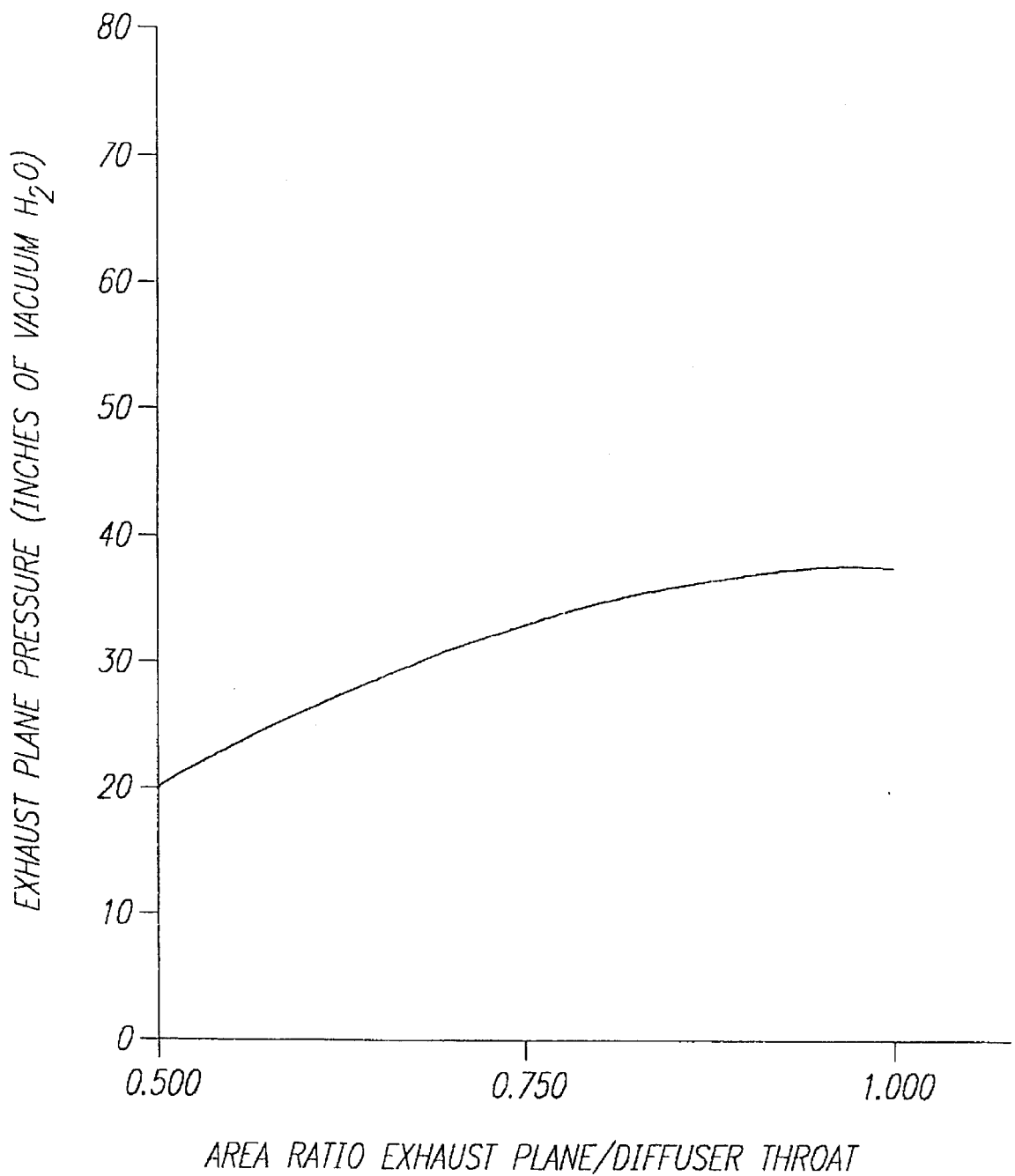
FIG. 3 is a graph depicting the theoretical relationship between pressure reduction at the exhaust plane of a typical 40-megawatt-class gas turbine engine and the ratio of the exhaust stream's cross-sectional area at the exhaust plane and at the point of minimum diffuser area.

It will be appreciated that the amount of pressure reduction achievable at the exhaust plane 105 of the gas turbine engine 101 will vary depending on the particular geometry of the ejector 113 and the diffuser 115. One important parameter is the ratio of the cross-sectional areas of the exhaust stream at the exhaust plane and at the point of the diffuser's minimum cross-sectional area. Generally, a greater pressure reduction is provided by increasing that ratio. FIG. 3 is a theoretical depiction of this relationship for one typical 40-megawatt-type gas turbine engine.

Figure 4:
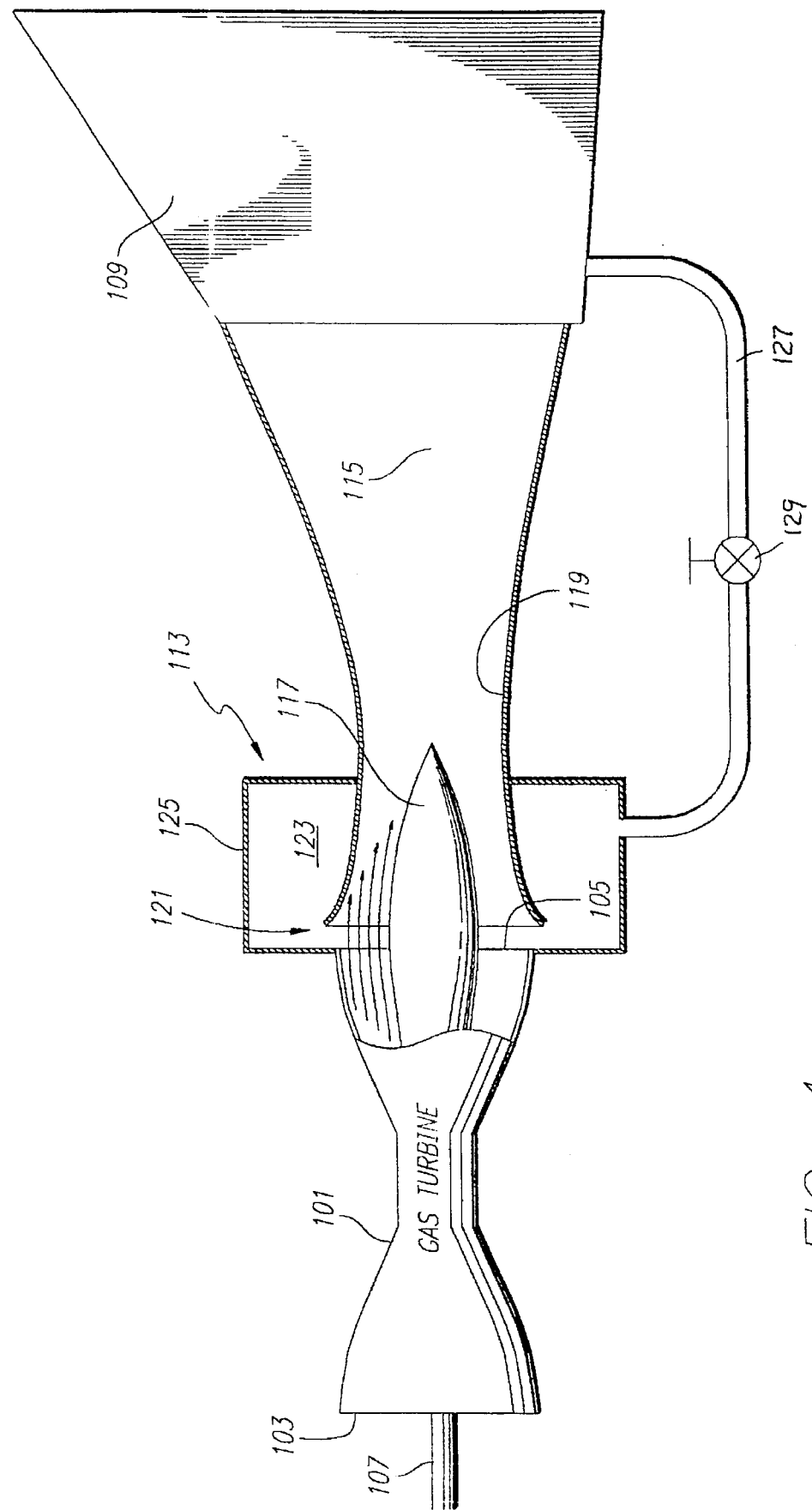
FIG. 4 is a schematic diagram of an alternative embodiment of a stationary gas turbine power system according to the present invention, similar to FIG. 2, but configured to regulate the pressure at the ejector by feeding back a portion of the exhaust gas to the ejector.

FIG. 4 depicts an alternative embodiment of a stationary gas turbine power system according to the invention, this embodiment differing from that of FIG. 2 in that it is configured to provide a tailored reduction in back pressure. Components of the FIG. 4 embodiment that are the same as the corresponding components of the FIG. 2 embodiment are identified by the same reference numerals. In the FIG. 4 embodiment, a feedback manifold or conduit 127 is connected between the downstream end of the diffuser 115 and the chamber 123 of the plenum 125. The gas pressure at the downstream end of the diffuser is, of course, greater than that within the chamber, so the conduit will channel a portion of the exhaust gas back to chamber and thereby raise its static pressure. A valve 129 is positioned along the conduit 127, to allow a selected amount of the exhaust gas to be fed back to the chamber 123, and thereby provide a tailored reduction of the pressure within the chamber 123 and at the engine's exhaust plane 105. Such control of the engine's back pressure can be advantageous in some applications.

It should be apparent from the foregoing description that the present invention provides a simple structure for improving the efficiency of a gas turbine engine that is part of a stationary gas turbine power system. An ejector and a diffuser are located in the exhaust stream, downstream of the engine's exhaust plane, to develop at the ejector, and thus at the exhaust plane, a sub-atmospheric pressure. This reduced back pressure dramatically improves the engine's efficiency.

Having thus described an exemplary embodiment of the invention, it will be apparent that further alterations, modifications, and improvements will also occur to those skilled in the art. Accordingly, the foregoing discussion is intended to be illustrative only, and the invention is limited and defined only by the following claims.

I claim:

1. A stationary gas turbine power system, comprising:

a stationary gas turbine engine having an exhaust plane through which an exhaust stream is expelled;

an ejector that includes an enclosure defining a space that is ported to a region located downstream of the exhaust plane of the gas turbine engine; and means for developing a sub-atmospheric pressure at the ejector and at the exhaust plane, to reduce the back pressure applied to the gas turbine engine and thereby improve the engine's efficiency.

2. A stationary gas turbine power system as defined in claim 1, wherein the means for developing a sub-atmospheric pressure includes a diffuser, located downstream of the ejector, that slows the speed of the exhaust stream and thereby recovers the exhaust stream's pressure to a predetermined level.

3. A stationary gas turbine power system as defined in claim 2, wherein:

the system further includes a utilization device for utilizing the exhaust stream received from the diffuser; and the diffuser recovers the exhaust stream's pressure to predetermined level sufficient to drive the utilization device.

4. A stationary gas turbine power system as defined in claim 1, wherein the space defined by the enclosure of the ejector is closed except for the port to the region downstream of the exhaust plane of the gas turbine engine.

5. A stationary gas turbine power system as defined in claim 1, wherein the ejector further includes a feedback conduit and a valve, for controllably varying the pressure within the space defined by the enclosure.

6. A stationary gas turbine power system as defined in claim 1, wherein the ejector is located adjacent to the exhaust plane of the gas turbine engine.

7. A stationary gas turbine power system comprising:

a stationary gas turbine engine having an exhaust plane through which an exhaust stream is expelled, the gas turbine engine including a generally annular exhaust port and a generally conical nozzle plug projecting downstream from the engine's exhaust plane;

an ejector located downstream of the exhaust plane of the gas turbine engine; and means for developing a sub-atmospheric pressure at the ejector and at the exhaust plane, to reduce the back pressure applied to the gas turbine engine and thereby improve the engine's efficiency;

wherein the ejector and the means for developing a sub-atmospheric pressure, together, include a generally conical wall encircling and concentric with the nozzle plug, for defining an annular exhaust flow path downstream of the engine's exhaust plane.

8. A stationary gas turbine power system as defined in claim 7, wherein the ejector includes an enclosure defining a space that is ported to a region downstream of the exhaust plane of the gas turbine engine.

9. A stationary gas turbine power system as defined in claim 7, wherein the annular exhaust flow path defined by the ejector has a cross-sectional area that is substantially constant along a major portion of its length.

10. A stationary gas turbine power system comprising:

a gas turbine engine having an exhaust plane through which an exhaust stream is expelled;

an ejector that includes an enclosure defining space that is ported to a region located downstream of the exhaust plane of the gas turbine engine; and a diffuser, located downstream of the ejector, that slows the speed of the exhaust stream and thereby recovers the exhaust stream's pressure to a predetermined level;

wherein the ejector reduces the pressure present at the exhaust plane of the gas turbine engine.

11. A stationary gas turbine power system as defined in claim 10, wherein:

the system further includes a utilization device for utilizing the exhaust stream received from the diffuser; and the diffuser recovers the exhaust stream's pressure to predetermined level sufficient to drive the utilization device.

12. A stationary gas turbine power system as defined in claim 10, wherein the space defined by the enclosure of the ejector is closed except for the port to the region downstream of the exhaust plane of the gas turbine engine.

13. A stationary gas turbine power system as defined in claim 10, wherein the ejector further includes a feedback conduit and a valve, for controllably varying the pressure within the space defined by the enclosure.

14. A stationary gas turbine power system as defined in claim 10, wherein the ejector is located adjacent to the exhaust plane of the gas turbine engine.

15. A stationary gas turbine power system comprising:

a gas turbine engine having an exhaust plane through which an exhaust stream is expelled, the gas turbine engine including a generally annular exhaust port and a generally conical nozzle plug projecting downstream from the engine's exhaust plane;

an ejector located downstream of the exhaust plane of the gas turbine engine: and a diffuser, located downstream of the ejector, that slows the speed of the exhaust stream and thereby recovers the exhaust stream's pressure to a predetermined level;

wherein the ejector reduces the pressure present at the exhaust plane of the gas turbine engine;

and wherein the ejector and the diffuser, together, include a generally conical wall encircling and concentric with the nozzle plug, for defining an annular exhaust flow path downstream of the engine's exhaust plane.

16. A stationary gas turbine power system as defined in claim 15, wherein the ejector includes an enclosure defining a space that is ported to a region downstream of the exhaust plane of the gas turbine engine.

17. A stationary gas turbine power system as defined in claim 15, wherein the annular exhaust flow path defined by the ejector has a cross-sectional area that is substantially constant along a major portion of its length.

18. A method for operating a stationary gas turbine power system having a gas turbine engine with an exhaust plane through which an exhaust stream is expelled, comprising:

positioning an ejector downstream of the exhaust plane of the gas turbine engine, the ejector including an annular port that encircles the exhaust stream; and positioning an enclosure around the annular port of the ejector, so as to define a chamber that is closed to the surrounding atmosphere, and developing a sub-atmospheric pressure at the ejector and at the exhaust plane, to reduce the back pressure applied to the gas turbine engine and thereby improve the engine's efficiency.

19. A method as defined in claim 18, wherein developing a sub-atmospheric pressure at the ejector and at the exhaust plane includes positioning a diffuser downstream of the ejector, to slow the speed of the exhaust stream and thereby recover the pressure of the exhaust stream to a predetermined level.

20. A method as defined in claim 19, wherein:

the method further includes positioning a utilization device downstream of the diffuser; and developing a sub-atmospheric pressure at the ejector and at the exhaust plane recovers the pressure of the exhaust stream to a level sufficient to drive the utilization device.

21. A method as defined in claim 18, wherein positioning the ejector includes positioning the ejector adjacent to the exhaust plane of the gas turbine engine.

* * * * *